United States Patent [19]

Koyamato

[11] 4,140,415
[45] Feb. 20, 1979

[54] ADJUSTABLE CONNECTOR

[75] Inventor: Hisakazu Koyamato, Hamamatsu, Japan

[73] Assignee: Nippon Gakki Seizo Kabushiki Kaisha, Japan

[21] Appl. No.: 763,616

[22] Filed: Jan. 28, 1977

[51] Int. Cl.² .............................................. E04G 25/02
[52] U.S. Cl. .................................... 403/104; 403/366; 248/413
[58] Field of Search ............... 403/104, 366, 362, 354, 403/290; 248/413

[56] References Cited

U.S. PATENT DOCUMENTS

| | | | |
|---|---|---|---|
| 1,309,375 | 7/1919 | Taylor | 248/413 |
| 2,572,928 | 10/1951 | Hawes | 403/104 X |
| 2,683,615 | 7/1954 | Holt | 248/413 X |
| 2,842,387 | 7/1958 | Della-Porta | 248/413 X |
| 2,927,757 | 3/1960 | Omohundro et al. | 248/413 |
| 3,463,520 | 8/1969 | Turro | 403/362 |
| 3,501,182 | 3/1970 | Buchsbaum | 403/366 X |
| 3,604,734 | 9/1971 | Friedman et al. | 403/366 X |

Primary Examiner—Andrew V. Kundrat
Attorney, Agent, or Firm—Ostrolenk, Faber, Gerb & Soffen

[57] ABSTRACT

Adjustable connector for connecting two tubular bodies such as pipes includes an outer sleeve connectable to one body, an elastically deformable inner sleeve connectable to the other body and accommodated within the outer sleeve and a fastening element to fasten the sleeves and the bodies together while causing elastic deformation of the inner sleeve. Overall pressured embracement of said other body by the inner sleeve deformed by the fastening element assures easy and reliable connection of the two bodies, avoids development of damages on the surfaces of the bodies even after repeated fastening and results in stably durable connection of the two bodies thanks to uniform distribution of fastening pressure over the entire portion of the inner sleeve surface.

8 Claims, 8 Drawing Figures

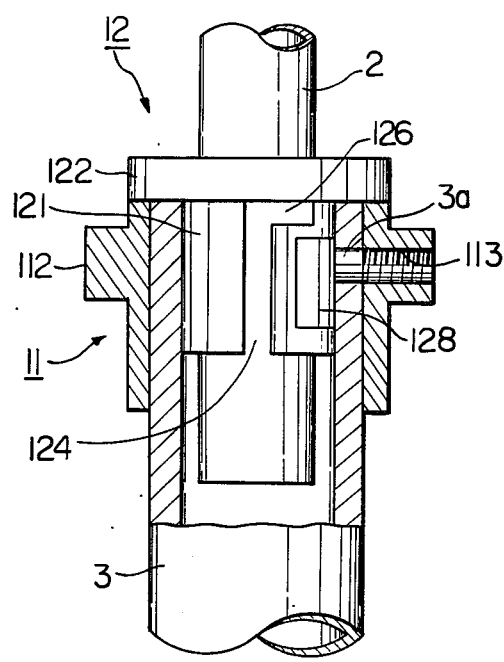
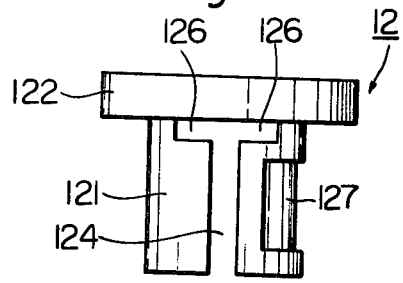
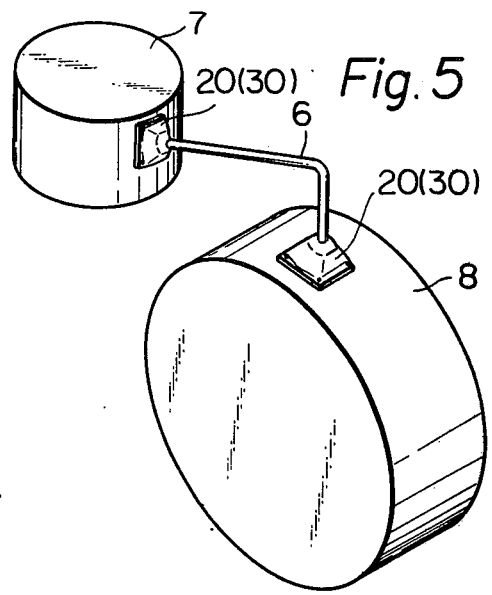
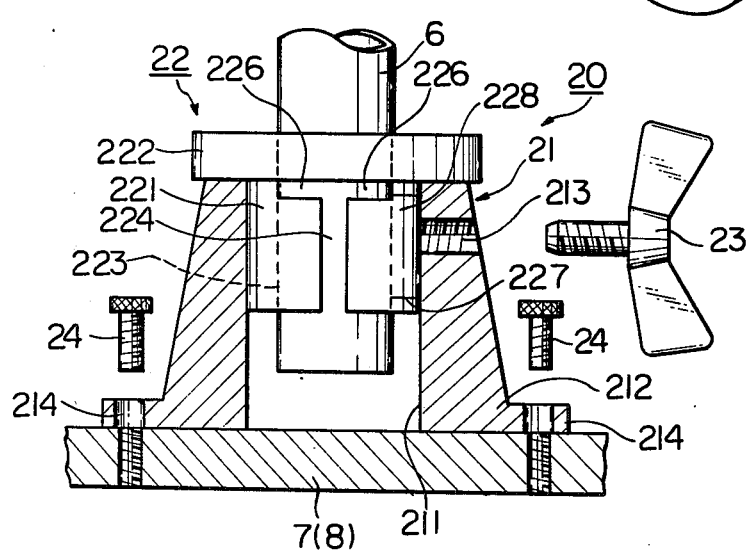

ADJUSTABLE CONNECTOR

BACKGROUND OF THE INVENTION

The present invention relates to an adjustable connector of two bodies, and more particulary relates to an improvement in the construction of a connector for adjustably connecting two separate bodies such as a movable supporting pipe for musical or acoustic instruments and a fixed stand, and a supporting pipe for these instruments.

In the typical construction of the conventional connector of the above-described kind, one end of a movable pipe for supporting the instruments is inserted axially into a fixed stand and, after registering the supporting pipe at a required position and level, the pipe is fixed to the stand by a fixing mechanism. In one type of fixing mechanism, a fixing screw is radially screwed into the stand and the point thereof firmly presses the supporting pipe toward the center axis. In another type of fixing mechanism, a connecting member is mounted to the stand, the supporting pipe is inserted into the connecting member and the connecting member is fastened by a suitable fastening screw. In general, the supporting pipe, the stand and the connecting member are all made of metallic materials in order to sufficiently bear loads caused by the connection.

Thus, the fixing or fastening is established on the basis of metal-to-metal frictional contact which may cause relatively easy slippage between the mutually contacting elements, e.g. the peripheral surface of the supporting pipe and the point of the fixing screw. In addition, as the contact is in the form of a point or line contact, the screw or the connecting member tends to encroach on the supporting pipe, thereby damaging the surface of the pipe after repeated fixing or fastening. Further, such a point or line contact often promotes slippage between the mutually contacting elements.

OBJECTS AND SUMMARY OF THE INVENTION

It is the principal object of the present invention to provide an adjustable connector which can assure easy but reliable connection of the two bodies.

It is another object of the present invention to provide an adjustable connector which successfully prevents the surfaces of the bodies from being damaged or marred even after repeated fastening.

It is the other object of the present invention to provide an adjustable connector which assures uniform distribution of fastening pressure over the entire contacting surface areas.

In accordance with the basic aspect of the present invention, an outer sleeve adapted for connection to one body, an inner sleeve adpated for connection to the other body and means for fastening the sleeves and the bodies are used in combination with each other. The inner sleeve is of an elastically deformable nature and inserted into the outer sleeve. Fastening by the fastening means causes elastic deformation of the inner sleeve, whereby the latter means neatly, snugly and completely embrace the other body.

BRIEF DESCRIPTION OF THE DRAWINGS

FIG. 3 is an elevational side view partly in section, of the embodiment shown in FIG. 2 in the assembled state, FIG. 4 is an elevational side view of an embodiment of the inner sleeve used in the embodiment shown in FIG. 2, FIG. 5 is a perspective view of an arrangement in which the present invention is applied to connection of a pipe to separate body, i.e. a a supporting pipe for supporting a small drum upon a large drum, FIG. 6 is an elevational side view, partly in section, of another embodiment of the present invention in a partly assembled state and used for the arrangement shown in FIG. 5.

DETAILED DESCRIPTION OF EMBODIMENTS OF THE INVENTION

Figure 1:
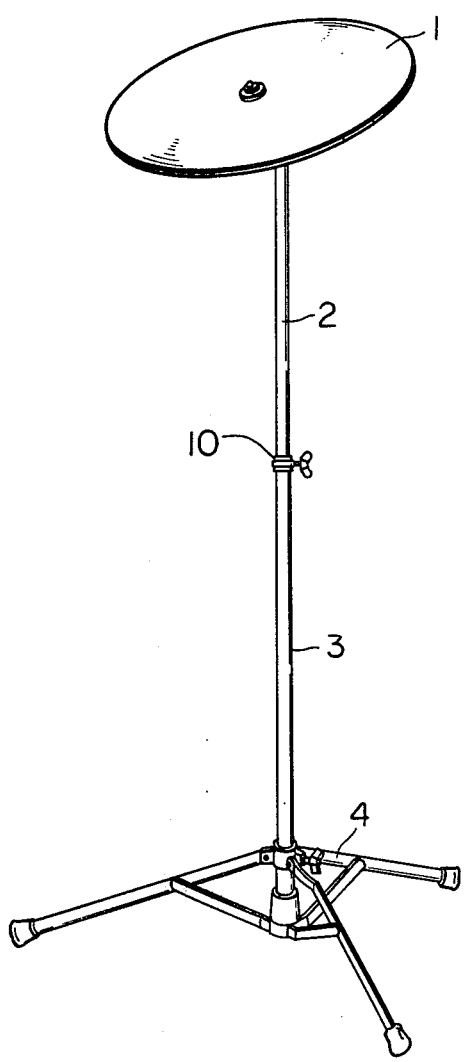
FIG. 1 is a perspective view of an arrangement in which the present invention is applied to connection of two pipes, i.e. a supporting pipe for a cymbal to a stand.

As already described, applications of the adjustable connector in accordance with the present invention are roughly classified into two major categories. That is, in the first category, the adjustable connector is used for connecting a pipe to another pipe and one example of the application in this category is shown in FIG. 1. Whereas, in the second category, the adjustable connector is used for connecting a pipe to another body and one example of the application in this category is shown in FIG. 5.

Referring to FIG. 1, a supporting pipe 2 holding a cymbal 1 is adjustably connected atop a stand 3 via an adjustable connector 10 embodying one aspect of the present invention and the stand 3 is mounted on legs 4.

Figure 2:
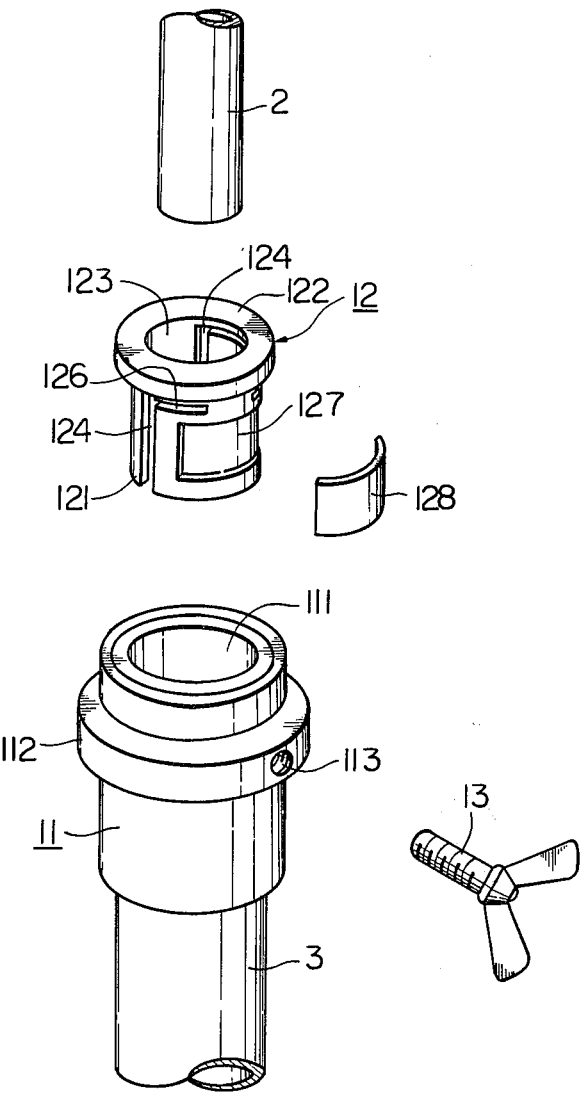
FIG. 2 is a perspective exploded view of an embodiment of the present invention in a disassembled state and used for the arrangement shown in FIG. 1.

One embodiment of the adjustable connector 10 used for this purpose is shown in FIGS. 2 through 4, in which the connector 10 comprises an outer sleeve 11 to be connected to the stand 3, an inner sleeve 12 to be connected to the pipe 2 and partly inserted into the stand 3 and a fastening screw 13 for fastening together the pipe 2, the stand 3 and the sleeves 11 and 12.

The inner sleeve 12 is composed of a cylindrical body portion 121 and an outer flange 122 formed, top the body portion 121 and an axial through hole 123 is formed through the flange 122 and the body portion 121. The through hole 123 is adapted for receiving over the pipe 2. The diameter of one embodiment of the adjustable connector 10 used for this purpose is shown in FIGS. 2 through 4, in which the connector 10 comprises an outer sleeve 11 to be connected to the stand 3, an inner sleeve 12 to be connected to the pipe 2 and partly inserted into the outer sleeve 11 and a fastening screw 13 for fastening the entire connection as hereinafter described in more detail.

The outer sleeve 11 is provided with an axial through hole 111 adapted for receiving over the top portion of the stand 3, an outer flange 112 and a radially threaded hole 113 formed in the outer flange 112 and adapted for threadedly receiving the fastening screw 13. The diameter of the through hole 111 should preferably be so selected that the top portion of the stand 3 can be snugly inserted into the through hole 111. It is necessary that the top portion of the stand 3 has a radial hole 3a at a position corresponding to the threaded hole 113 of the outer sleeve 11 in the assembled state of the stand 3 with the outer sleeve 11. This radial hole 3a may be either an idle hole or a threaded hole. The through hole 123 in member 12 should preferably be so selected that the pipe 2 can be snugly inserted into the through hole 123. The diameter of the outer flange 122 should be greater than the inner outer diameter of the stand 3 and the diameter of the body portion 121 should be equal to or smaller than the abovedescribed inner diameter of the stand 3.

At diametrically opposite diametral positions, the body portion 121 is provided with narrow longitudinal or axially oriented slots 124 each opening downwardly and merging upwardly into a transversely aligned short peripheral slot 126 formed just below the outer flange 122. In the embodiment shown in FIG. 3, the peripheral slot 126 extends from one side of the longitudinal slot 124. However, two peripheral slots 126 may extend from opposite sides of the longitudinal slot 124 as shown in FIG. 4.

At a position between the peripheral slot 126 and the bottom end, the body portion 121 is further provided with a shallow peripheral recess 127 adapted for receiving a fitting plate 128.

The inner sleeve 12 is made of an elastic material such as plastics or rubber and the fitting plate 128 is preferably made of a harder material such as metal.

For connecting the pipe 2 to the stand 3 using the adjustable connector 10 of the above described construction, the inner sleeve 12 is inserted into the axial through hole 111 defined by the outer sleeve 11, that is, in this instance, by the top portion of the stand 3 so that the outer flange 122 abuts and hence rests on the upper end surface of the outer sleeve 11 and that the position of the fitting plate 128 corresponds to that of the collimated holes 3a and 113. Then the pipe 2 is inserted into the axial through hole 123 of the inner sleeve 12 to an extent that the cymbal 1 is held at a required level. Finally, the fastening screw 13 is screwed into the threaded hole 113 of the outer sleeve 11 until the point thereof comes into pressure contact with the fitting plate 128. By this fastening of the screw 13, the pressed side of the body portion 121 of the inner sleeve 11 is deformed so that the entire body portion 121 embraces the pipe 2 quite neatly and snugly thanks to its elastically deformable nature. Thus, the pipe 2 is fixedly connected to the stand 3 via the outer and inner sleeves 11 and 12, i.e. the adjustable connector 10 of the present invention.

For adjustment of the level or posture of the cymbal 1, the fastening screw 13 is loosened, the pipe 2 is longitudinally slid or turned about its longitudinal axis in the inner sleeve 12 in order to be registered at a newly selected position or posture and the screw 13 is fastened again.

Holding of the pipe 2 via the pressure surface contact of the elastic inner sleeve 12 with the metallic pipe 2 is more stable and reliable than that via the conventional metal-to-metal contact. In addition, as fixing pressure is applied indirectly to the pipe surface via an elastic intervening element, i.e. the inner sleeve 12, undesirable damage on the pipe surface by fastening can fairly be avoided even after repeated fastening.

When the fitting plate 128 of a harder material is used, damage to the surface of the inner sleeve 12 by the fastening screw 13 can be successfully obviated. Use of the fitting plate 128 has another effect that the point pressure force by the screw 13 can be distributed over the entire area of the fitting plate 128 and converted into corresponding surface pressure to be applied to the pipe 2. This brings about uniform overall embracement of the pipe 2 by the inner sleeve 12, which does not allow easy slippage between the two elements 2 and 12.

In the above-mentioned embodiment, the outer sleeve 11 is made separately from the pipe 3 and thereafter they are fixed together. However, the outer sleeve may be made integral as one piece with the pipe 3 to simplify the construction of the outer sleeve.

In the arrangement shown in FIG. 5, a supporting pipe 6 holding a small drum 7 at one end thereof is connected atop to a large drum 8 at the other end thereof. Both connections are established using adjustable connectors 20, embodying another aspect of the present invention.

One embodiment of the adjustable connector 20 used for this purpose is shown in FIG. 6, in which the connector 20 comprises an outer sleeve 21 to be connected to the drum 7 or 8, an inner sleeve 22 to be connected to the pipe 6 and partly inserted into the outer sleeve 21, a fastening screw 23 for fastening the pipe 6 to the sleeves 21 and 22 and set screws 24 for fixing the entire construction to the drum 7 or 8.

The outer sleeve 21 is provided with an axial through hole 211 adapted for receiving the inner sleeve 22, an outer flange 212 formed at the end thereof to mate with the drum 7 or 8, a radial threaded hole 213 opening in the through hole 211 and adapted for receiving the fastening screw 23 and through holes 214 formed longitudinally in the flange 212 and adapted for passing the set screws 24. The through holes 214 may be either idle holes or threaded holes.

The construction of the inner sleeve 22 is substantially same with one 12 shown in FIG. 4 and used in the embodiment shown in FIGS. 2 and 3. Namely, the inner sleeve 22 has a cylindrical body portion 221, an outer flange 222, an axial through hole 223, longitudinal slots 224, peripheral slots 226, a recess 227 and a fitting plate 228.

The outer diameter of the body portion 221 should preferably be so selected that the same can be snugly inserted into the through hole 211 of the outer sleeve 21, the diameter of the through hole 223 should preferably be so selected that the pipe 6 can be snugly inserted into the through hole 223 and the outer diameter of the outer flange 222 should be greater than the diameter of the through hole 211 of the outer sleeve 21.

Like the foregoing embodiment, the inner sleeve 22 is made of an elastic material such as plastics or rubber and the fitting plate 228 is made of a harder material such as metal.

For connecting the pipe 6 to the drum, e.g. the drum 8, using the adjustable connector 20 of the above-described construction, the outer sleeve 21 is fixed to the prescribed position on the body portion of of the drum 8 via set screws 24. The inner sleeve 22 is coupled to the outer sleeve 21. Next, the pipe 6 is inserted into the inner sleeve 22, held at a registered position and fixed to the registered position via the fastening screw 23.

For adjustment of the level or position of the drum carried by the pipe 6, the fastening screw 23 is loosened, the pipe 6 is longitudinally slid or turned about its longitudinal axis in the inner sleeve 22 in order to be registered at a newly selected level or position and the screw is refastened.

Figure 7:
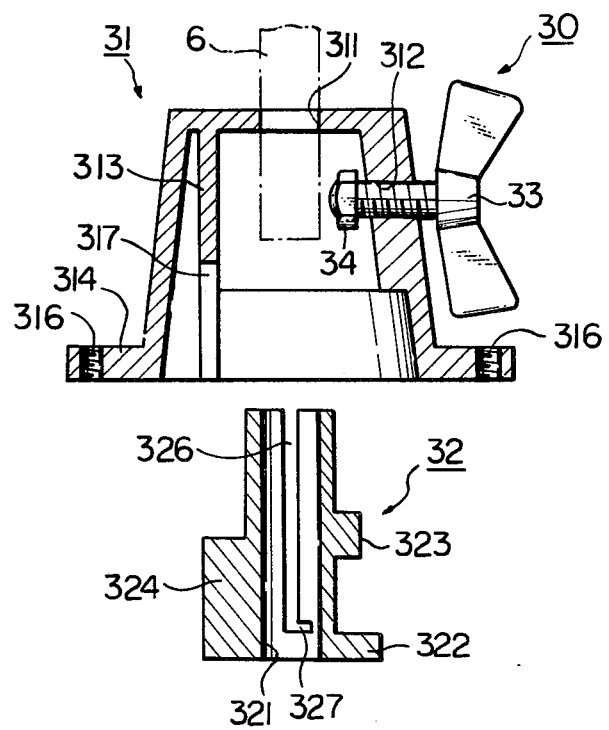
FIG. 7 is an elevational side view, partly in section, of a variant of the embodiment shown in FIG. 6 in a partly assembled state.
Figure 8:
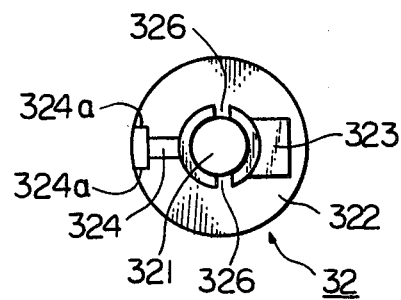
FIG. 8 is a top view of the inner sleeve used in the embodiment shown in FIG. 7.

A variant of the above-described embodiment is shown in FIGS. 7 and 8, in which the adjustable connector 30 comprises an outer sleeve 31 to be connected to the drum 7 or 8, an inner sleeve 32 to be connected to the pipe 6 and fully encased within the outer sleeve 31 and a fastening screw 33 for fastening the pipe 6 to the sleeves 31 and 32.

The outer sleeve 31 is provided with an axial through hole 311 formed in the top wall thereof and adapted for receiving the pipe 6, a radial through hole 312 adapted for passing the fastening screw 33, an inner bulkhead 313 upwardly connected to the top wall and located opposite to the threaded hole 312 with respect to the center axis, an outer flange 314 formed on the end to mate the drum and through holes 316 formed in the flange 314 and adapted for passing the set screws like those shown in FIG. 6. The inner bulkhead 313 is provided in the lower side thereof with a longitudinal slot 317.

The fastening screw 33 in this embodiment is provided with a nut 34.

The inner sleeve 32 is provided with an axial through hole 321, an outer flange 322 formed on the end to engage the surface of the drum, a radial projection 323 adapted for providing an abutment for the nut 34 as hereinafter described and a radial projection 324 formed opposite to the projection 323 with respect to the center axis and adapted for engagement with the longitudinal slot 317 of the outer sleeve 31 when both sleeves 31 and 32 are coupled with each other. For reliable engagement, the projection 324 is provided at the outer end thereof with lateral bulges 324a.

At diametrically opposite positions, a pair of axially oriented longitudinal slots 326 are formed in the peripheral wall of the inner sleeve 32. Each of the slots 326 is upwardly open and downwardly merges into a short peripheral slot 327.

As in the previous embodiments, the inner sleeve 32 of this embodiment is also made of an elastic material such as plastics or rubber.

For connecting the pipe 6 to the drum using the adjustable connector 30 of the above-described construction, the fastening screw 33 is screwed into the threaded hole 312 of the outer sleeve 31 until an appreciable length of its point portion is exposed in the interior of the outer sleeve 31 and the nut 34 is screwed over this exposed point portion of the fastening screw 33. Next, the inner sleeve 32 is inserted into the outer sleeve 31 until the top surface of the radial projection 323 abuts against the nut 34 in such a manner that the radial projection 324 engages with the longitudinal slot 317 of the bulkhead 313 and the lateral bulges 324a are received within the gap between the bulkhead 313 and the peripheral wall of the outer sleeve 31. Keeping this provisionally coupled state of both sleeves 31 and 32, the pipe 6 is inserted, through the through hole 311 of the outer sleeve 31 and into the through hole 321 of the inner sleeve 32. After registering the pipe at the required level and/or position, the fastening screw 33 is screwed into the nut 34 via the through hole 312 of the outer sleeve 31 until the point thereof comes into pressure contact with the inner sleeve 32. By this fastening of the screw 33, the pressed side of the inner sleeve 32 is deformed so that the entire portion of the inner sleeve 32 embraces the pipe 6 quite neatly and snugly thanks to its elastically deformable nature. During this fastening procedure of the screw 33, associated axial turning of the nut 34 is effectively barred by its abutment against the top surface of the radial projection 323 and axial turning of the inner sleeve 32 is effectively prevented by the engagement of the radial projection 324 with the longitudinal slot 317 of the bulkhead 313.

As already described, the radial projection 324 is formed at a position diametrically opposite to that of the radial projection 323 and the longitudinal slot 317 is formed at a position diametrically opposite to that of the hole 312 for the fastening screw 33. So, only by coupling the sleeves 31 and 32 in such a manner that the projection 324 engages with the slot 317, the radial projection 324 can automatically be registered at a position corresponding to the point of the fastening screw 33 inserted into the radial hole 312 of the outer sleeve 31.

I claim:
1. An adjustable connector comprising:
an outer sleeve having an axial through hole formed therein;
an inner sleeve having an axial through hole formed therein, said inner sleeve comprising a body portion and an outer flange portion, said body portion having first and second axial ends and adapted to be inserted into said axial through hole of said outer sleeve, said outer flange portion being formed at said first end of said body portion and adapted to act as a stopper for limiting the movement of said inner sleeve into said axial through hole of said outer sleeve, said body portion having a pair of generally axially oriented slots formed in the periphery of said body portion and opening in said second end thereof whereby said body portion may be elastically deformed in a radial direction; and each of said pair of axially oriented slots merges into at least one circumferentially oriented slot formed in said body portion of said inner sleeve.
fastening means coupled to said outer sleeve and capable of pressing said body portion of said inner sleeve so as to cause elastic deformation of said body portion

2. An adjustable connector as claimed in claim 1, wherein said inner sleeve has a recess formed in the outer surface of said body portion and wherein a fitting plate is received within said recess.

3. An adjustable connector as claimed in claim 1, wherein said outer sleeve has a threaded radial through hole and said fastening means includes a fastening screw screwed into said threaded radial through hole.

4. An adjustable connector comprising:
an outer sleeve having an axial through hole formed therein and an inner bulkhead extending longitudinally in said axial through hole;
an inner sleeve having an axial through hole formed therein and an outer flange acting as a stopper for positioning the inward movement of said inner sleeve into said axial through hole of said outer sleeve, said inner sleeve further having a pair of generally axially oriented slots formed in the periphery thereof and extending through a sufficient portion of said inner sleeve so as to allow a radial elastic deformation of said inner sleeve, and a radial outer projection to be received in a longitudinal slot formed in said bulkhead of said outer sleeve; and
fastening means coupled to said outer sleeve and capable of pressing said inner sleeve so as to cause said radial elastic deformation.

5. An adjustable connector as claimed in claim 4, wherein each of said pair of axially oriented slots merges into a respective circumferentially oriented slot formed in said inner sleeve.

6. The adjustable connector as claimed in claim 4, wherein said outer sleeve has a radial threaded through hole and said fastening means includes a fastening screw screwed into said radial threaded through hole of said outer sleeve.

7. An adjustable connector comprising:
an outer sleeve having an axial through hole formed therein;
an inner sleeve having an axial through hole formed therein, said inner sleeve comprising a body portion and an outer flange portion, said body portion having first and second axial ends and adapted to be inserted into said axial through hole of said outer sleeve, said outer flange portion being formed at said first end of said body portion and adapted to act as a stopper for limiting movement of said inner sleeve into said axial through hole of said outer sleeve, said body portion having a pair of generally axially oriented slots formed in the periphery of said body portion and opening in said second end of said body portion whereby said body portion may be elastically deformed in a radial direction and a recess formed in the outer surface of said body portion;
a fitting plate accommodated within said recess of said body portion of said inner sleeve; and
fastening means coupled to said outer sleeve and capable of pressing said body portion of said inner sleeve so as to cause elastic deformation of said body portion.

8. An adjustable connector as claimed in claim 7 wherein said outer sleeve has a threaded radial through hole and said fastening means includes a fastening screw screwed into said threaded radial hole.

* * * * *